United States Patent
Hsu et al.

(10) Patent No.: US 11,285,944 B2
(45) Date of Patent: Mar. 29, 2022

(54) AUTOMATIC DRIVING METHOD AND DEVICE ABLE TO DIAGNOSE DECISIONS

(71) Applicant: AUTOMOTIVE RESEARCH & TESTING CENTER, Changhua County (TW)

(72) Inventors: Tsung-Ming Hsu, Changhua County (TW); Yu-Rui Chen, Changhua County (TW); Cheng-Hsien Wang, Changhua County (TW)

(73) Assignee: Automotive Research & Testing Center, Lugang (TW)

( * ) Notice: Subject to any disclaimer, the term of this patent is extended or adjusted under 35 U.S.C. 154(b) by 217 days.

(21) Appl. No.: 16/227,584

(22) Filed: Dec. 20, 2018

(65) Prior Publication Data

US 2020/0122720 A1  Apr. 23, 2020

(30) Foreign Application Priority Data

Oct. 19, 2018 (TW) .................................. 107136898

(51) Int. Cl.
*B60W 30/095* (2012.01)
*B60W 30/02* (2012.01)
(Continued)

(52) U.S. Cl.
CPC ........ *B60W 30/0956* (2013.01); *B60W 30/02* (2013.01); *B60W 30/0953* (2013.01);
(Continued)

(58) Field of Classification Search
CPC ..... G06N 5/045; G06N 7/00; B60W 30/0953; B60W 50/0097; B60W 30/0956;
(Continued)

(56) References Cited

U.S. PATENT DOCUMENTS

| 2004/0073534 A1* | 4/2004 | Robson .................. G16B 50/00 |
| 2012/0245817 A1* | 9/2012 | Cooprider ............. B60W 30/12 701/70 |

(Continued)

OTHER PUBLICATIONS

Shai Shalev-Shwartz, Shaked Shammah, Amnon Shashua; On a Formal Model of Safe and Scalable Self-Driving Cars; Mobileye, 2017.

*Primary Examiner* — Igor N Borissov
(74) *Attorney, Agent, or Firm* — Rosenberg, Klein & Lee

(57) ABSTRACT

An automatic driving method and device able to diagnose decisions is disclosed herein, wherein a vehicle body signal sensor detects vehicle body information, and an environment sensor detects traffic environment information. The information is transmitted to a central processor to generate a future driving track. The central processor examines whether the differences between the future driving track and the traffic environment information and the indexes of the future driving track meet tolerances. If no, the central processor transmits notification information to an automatic driving controller. If yes, the central processor transmits the future driving track to the automatic driving controller to make the automatic driving controller undertake automatic driving according to the future driving track. The present invention can automatically judge whether the future driving track generated by the central processor is within tolerances and determine whether the automatic driving track is safe.

15 Claims, 3 Drawing Sheets

(51) Int. Cl.
  *B60W 50/00* (2006.01)
  *G05D 1/00* (2006.01)
  *G05D 1/02* (2020.01)
  *G06N 7/00* (2006.01)
  *G07C 5/08* (2006.01)

(52) U.S. Cl.
  CPC ....... *B60W 50/0097* (2013.01); *G05D 1/0061* (2013.01); *G05D 1/0088* (2013.01); *G05D 1/0214* (2013.01); *G06N 7/00* (2013.01); *G07C 5/0808* (2013.01); *B60W 2050/007* (2013.01); *B60W 2400/00* (2013.01); *B60W 2420/42* (2013.01); *B60W 2520/105* (2013.01); *B60W 2552/30* (2020.02); *B60W 2554/00* (2020.02); *B60W 2554/801* (2020.02); *G05D 2201/0213* (2013.01)

(58) Field of Classification Search
  CPC ....... B60W 2552/30; B60W 2520/105; B60W 2554/801; B60W 30/02; G05D 1/0088; G05D 2201/0213; G05D 1/0061; G05D 1/0214; G07C 5/0808
  USPC .............................................. 701/23, 26, 27
  See application file for complete search history.

(56) References Cited

U.S. PATENT DOCUMENTS

| | | | |
|---|---|---|---|
| 2013/0253767 A1* | 9/2013 | Lee ....................... | B60W 50/04 701/42 |
| 2016/0098605 A1* | 4/2016 | Okada ................... | B60W 30/12 382/104 |
| 2017/0066450 A1* | 3/2017 | Ko ........................ | B60W 30/10 |
| 2018/0032082 A1* | 2/2018 | Shalev-Shwartz ... | G05D 1/0231 |
| 2019/0025063 A1* | 1/2019 | Eigel ..................... | B60W 30/10 |

* cited by examiner

AUTOMATIC DRIVING METHOD AND DEVICE ABLE TO DIAGNOSE DECISIONS

This application claims priority for Taiwan patent application no. 107136898 filed on Oct. 19, 2018, the content of which is incorporated by reference in its entirely.

BACKGROUND OF THE INVENTION

Field of the Invention

The present invention relates to a technology for checking an automatic driving device, particularly to an automatic driving method and device able to diagnose decisions.

Description of the Related Art

As the name suggests, an autonomous vehicle is an unmanned vehicle free of a driver but able to drive autonomously. Although an autonomous vehicle is free of a driver, it can detect the environment around the vehicle, such as traffic lane lines and obstacles. The information of the driving environment is analyzed to work out a track for automatic driving.

The National Highway Traffic Safety Administration (NHTSA) classifies vehicle automation into 6 levels, including Level 0: no automatic driving system is involved, and the driver is in complete and sole control of the vehicle; Level 1: the vehicle is still mainly operated by the driver, but a dynamic vehicle body stabilization system or an anti-lock brake system is used to prevent the vehicle from being out of control in an emergency and thus enhance driving safety; Level 2: the vehicle is still mainly controlled by the driver, but an automatic speed control system or an automatic barrier detection and braking system is used to assist the driver; Level 3: the vehicle is controlled by an automatic driving system normally, but a driver is still in the vehicle and standby to take over the control any time if necessary; Level 4: the vehicle operates almost completely automatically; for example, the vehicle undertakes parking, turning, acceleration, changing traffic lanes, etc. automatically according to the traffic lights, lane markers, etc.; however, the vehicle still needs manually driving while dim light or rain disables the automatic driving system from judging the traffic conditions; Level 5: the vehicle is completely operated by an automatic driving system, exempted from any driver.

Many automobile manufacturers spend a lot of resources in developing automatic driving-assistant systems. However, many uncertainties still exist in automatic driving systems. There had been autonomous vehicles involved in traffic accidents and causing injuries and deaths. Therefore, it is a critical point for automatic driving to make the automatic driving systems able to identify traffic lanes and evaluate driving tracks correctly and able to alert the driver or correct the driving parameters timely, whereby to reduce the instability of automatic driving and decrease the probability of accidents.

Accordingly, the present invention proposes an automatic driving method and device able to diagnose decisions to solve the abovementioned conventional problems.

SUMMARY OF THE INVENTION

The primary objective of the present invention is to provide an automatic driving method and device able to diagnose decisions, which can diagnose the future driving track of an automatic driving assistant system and check the parameters of the traffic environment, such as the curvature and width of a traffic lane and the distance to a barrier, to evaluate whether these parameters are within the tolerances thereof and determine whether the driving track of the automatic driving assistant system is safe, whereby to improve the safety of automatic driving.

Another objective of the present invention is to provide an automatic driving method and device able to diagnose decisions, which uses a diagnostic equation to directly determine whether there is any parameter needing calibration in the future driving track, whereby to enhance the safety of automatic driving.

Yet another objective of the present invention is to provide an automatic driving method and device able to diagnose decisions, which can judge whether the future driving track generated by the automatic driving assistant system is safe and calibrate the future driving track if necessary, whereby to promote the safety of automatic driving.

In order to achieve the abovementioned objectives, the present invention proposes an automatic driving method able to diagnose decisions, which comprises steps: receiving vehicle body information of a present vehicle and traffic environment information; generating a future driving track of the present vehicle according to the vehicle body information; introducing the future driving rack and the traffic environment information into a diagnostic equation to examine whether the differences between the future driving tack and the traffic environment information and the indexes of the future driving track respectively meet the tolerances thereof; if no, sending notification information to an automatic driving controller; if yes, transmitting the future driving track to the automatic driving controller to make the automatic driving controller perform automatic driving according to the future driving track.

The vehicle body information includes present vehicle steering wheel angular velocity information; present vehicle speed information; present vehicle acceleration-deceleration information, and present vehicle coordinate information. The traffic environment information is an image information. According to the image information, the following information can be worked out, including lane marker curvature information, distance to another vehicle information, left lane marker position information, right lane marker position information, and another vehicle speed information. The diagnostic equation is expressed by $$L = \log \left\{ \prod_{t=1}^{n} \left[ \frac{2 \Pi_{i=1}^{2} I(|K_H(x_t) - K_i(x_t)| \geq \varepsilon_K) 3^{I(D-V/2 \leq 0)} 7^{I(a_H J_H / SR_H \geq \varepsilon_A)} 13^{I(LTR \geq \varepsilon_L)}}{5^{I(|D_L(x_t, y_t) - D_R(x_t, y_t)| \geq \varepsilon_D)} 11^{I(doLG)[I(TTC_H(Forward) \leq \varepsilon_F) \cdot I(TTC_R(Host) \leq \varepsilon_R)]}} \right] \right\}$$

wherein L is the deviation value; I(∋) is the indicator function; $K_H(x_t)$ is the future driving curvature at the present vehicle coordinate information $x_t$; $K_i(x_t)$ is the lane marker curvature information at the present vehicle coordinate information $x_t$; $\varepsilon_K$ is the tolerance of the curvature; D is the distance to another vehicle information; V is the present vehicle speed information; $a_H$ is the present vehicle acceleration-deceleration information; $J_H$ is the present vehicle jerk information; $SR_H$ is the present vehicle steering wheel angular velocity information; $(a_H J_H / SR_H)$ is the equation for calculating lateral slide displacement index; $\varepsilon_A$ is the tolerance of lateral slide displacement; LTR (Load Transfer Ration) is the vehicle turnover index; $\varepsilon_L$ is the tolerance of turnover; $D_L(x_t,y_t)$ is the distance between the present vehicle coordinate information $x_t,y_t$ and the left lane marker position information; $D_R(x_t,y_t)$ is the distance between the present vehicle coordinate information $x_t,y_t$ and the right lane marker position information; $\varepsilon_D$ is the tolerance of difference of distances to left and right lane markers; $TTC_H$ (Forward) is the forward collision time index; $\varepsilon_F$ is the tolerance of forward collision time; $TTC_R$(Host) is the rear collision time index; $\varepsilon_R$ is the tolerance of rear collision time; 2, 3, 5, 7, 11, and 13 are the numerals respectively representing different events; do LG(do lane change) is the event that the present vehicle changes lanes.

The present invention also proposes an automatic driving device able to diagnose decisions, which comprises at least one vehicle body signal sensor detecting a present vehicle to generate vehicle body information; at least one environment sensor detecting external environment to generate traffic environment information; a central processor electrically connected with the vehicle body signal sensor and the environment sensor, generating a future driving track according to the vehicle body information, and introducing the future driving track and the traffic environment information into a diagnostic equation. If the difference value between the future driving track and the traffic environment information and the index of the future driving track cannot meet tolerances, the central processor transmits notification information to an automatic driving controller that is electrically with the central processor. If the difference value between the future driving track and the traffic environment information and the index of the future driving track meet tolerances, the central processor directly transmits the future driving track to the automatic driving controller. Then, the automatic driving controller undertakes automatic driving according to the future driving track.

Below, embodiments are described in detail to make easily understood the objectives, technical contents, characteristics and accomplishments of the present invention.

DETAILED DESCRIPTION OF THE INVENTION

Figure 1:
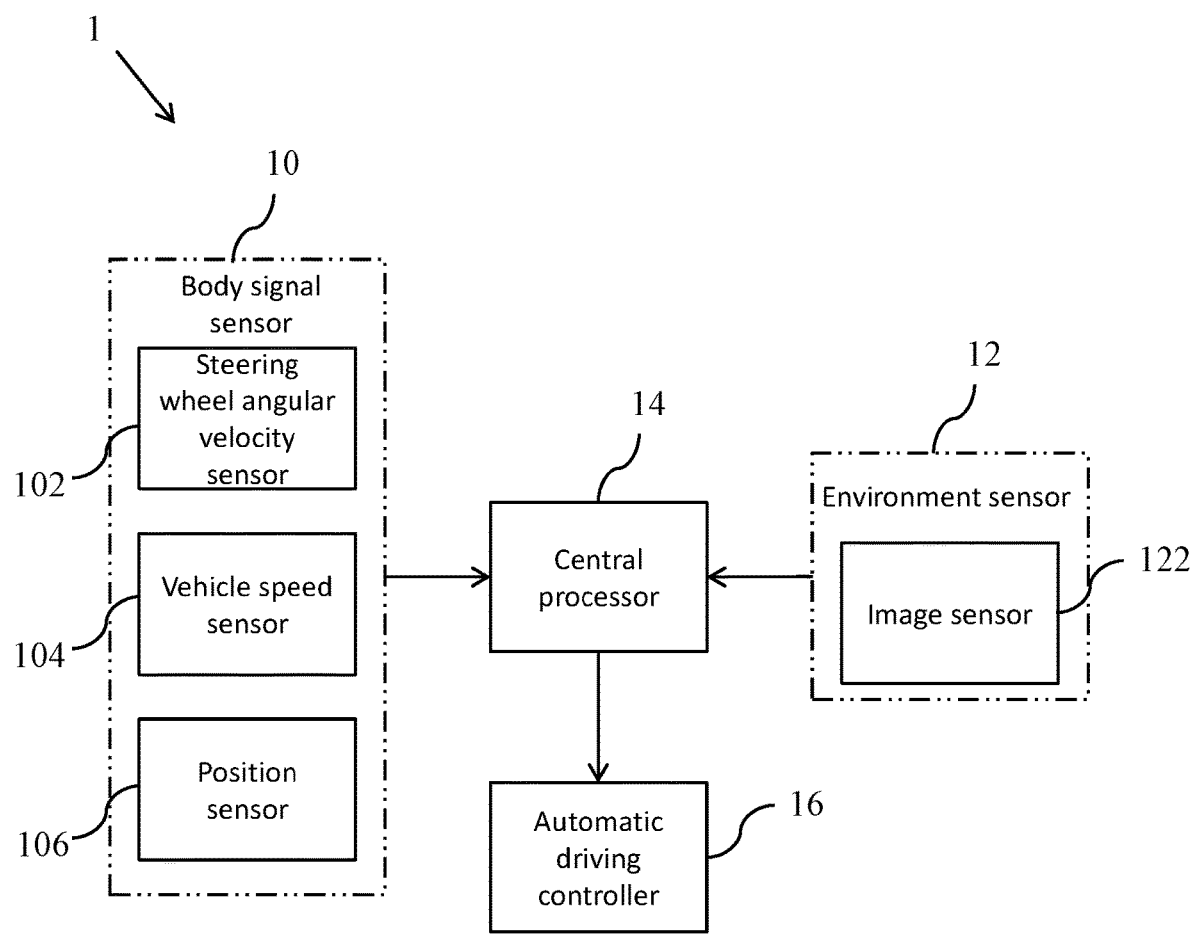
FIG. 1 is a block diagram schematically showing the architecture of an automatic driving device able to diagnose decisions according to one embodiment of the present invention.

Refer to FIG. 1 for the architecture of an automatic driving device 1 able to diagnose decisions of the present invention. The automatic driving device 1 comprises at least one vehicle body signal sensor 10; at least one environment sensor 12; a central processor 14; and an automatic driving controller 16. The vehicle body signal sensor 10 detects the present vehicle to generate vehicle body information. The vehicle body information includes present vehicle steering wheel angular velocity information, present vehicle speed information, present vehicle acceleration-deceleration information, and present vehicle coordinate information. The environment sensor 12 detects external environment to generate traffic environment information. The central processor 14 is electrically connected with the vehicle body signal sensor 10, the environment sensor 12, and the automatic driving controller 16. The central processor 14 receives the vehicle body signals generated by the vehicle body signal sensor 10 and the traffic environment information generated by the environment sensor 12. The central processor 14 works out a future driving track according to the vehicle body signals and introduces the future driving track and the traffic environment information into a diagnostic equation to diagnose whether the future driving track is safe. If the future driving track is safe, the central processor 14 transmits the future driving track to the automatic driving controller 16 to implement automatic driving. If the future driving track is unsafe, the central processor 14 sends a notification to the automatic driving controller 16 to stop the vehicle or modify the future driving track.

Refer to FIG. 1 again for the details of the vehicle body signal sensor 10. In the embodiment shown in FIG. 1, the automatic driving device 1 comprises a plurality of vehicle body signal sensors 10, including a steering wheel angular velocity sensor 102, a vehicle speed sensor 104, and a position sensor 106. The steering wheel angular velocity sensor 102 generates the present vehicle steering wheel angular velocity information of the vehicle body information. The vehicle speed sensor 104 generates the present vehicle speed information and the present vehicle acceleration-deceleration information of the vehicle body information.

The position sensor 106 may be a global positioning system (GPS), generating the present vehicle coordinate information of the vehicle body information.

The environment sensor 12 may be a radar sensor or an image sensor. In this embodiment, the environment sensor 12 is an image sensor 122, such as a camera device capturing the surrounding images to generate image information. According to the image information, the following information can be worked out, including lane marker curvature information, distance to another vehicle information, left lane marker position information, right lane marker position information, and another vehicle speed information. The image information of the image sensor 122 may be used to determine the relative coordinate information of the present vehicle coordinate information and another vehicle coordinate information. For example, let the present vehicle coordinate information always be (0, 0); the position of another vehicle or a barrier can be worked out with the distance from the present vehicle to another vehicle or the barrier. In such a case, the present vehicle coordinate information and another vehicle coordinate information can be generated without using the position sensor 106. In this embodiment, the position sensor 106 is exemplarily used to generate coordinate information.

Figure 2:
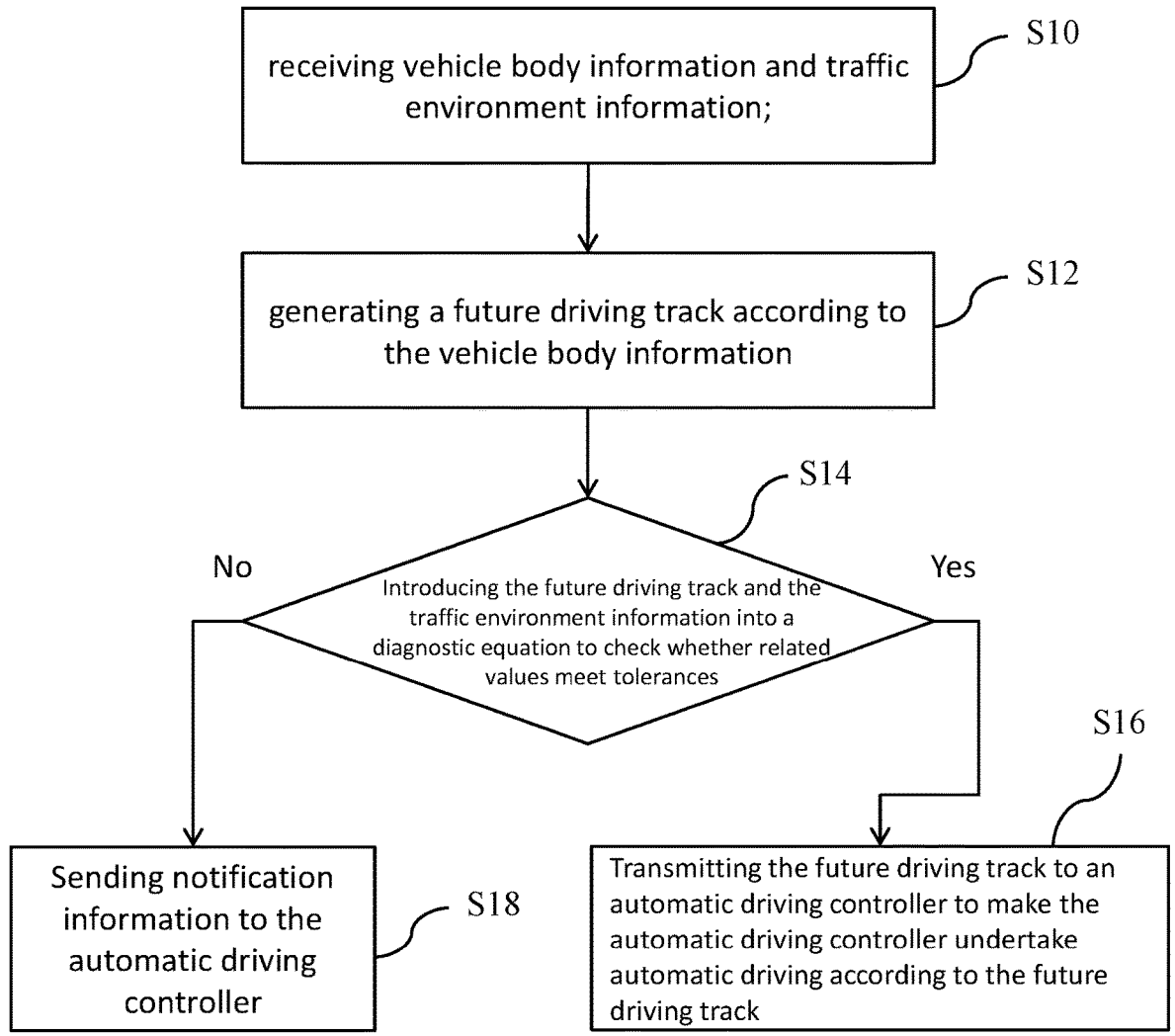
FIG. 2 is a flowchart schematically showing an automatic driving method able to diagnose decisions according to one embodiment of the present invention.

After the architecture of an automatic driving device 1 able to diagnose decisions has been described above, the automatic driving method able to diagnose decisions of the present invention will be described below. Refer to FIG. 1 and FIG. 2. In the embodiment shown in FIG. 2, the method of the present invention comprises steps S10-S18. In Step S10, the central processor 14 receives vehicle body information of a present vehicle from the vehicle body signal sensor 10 and traffic environment information generated by the environment sensor 12. The vehicle body information includes present vehicle steering wheel angular velocity information, present vehicle speed information, present vehicle acceleration-deceleration information, and present vehicle coordinate information. The traffic environment information includes lane marker curvature information, distance to another vehicle information, left lane marker position information, right lane marker position information, and another vehicle speed information.

In Step S12, the central processor 14 generates a future driving track of the present vehicle according to the vehicle body information. The future driving track includes lane marker curvature information, a neighboring vehicle distance index, a lateral slide displacement index, a vehicle turnover index, a forward collision time index, and a rear collision time index. In Step S14, the central processor 14 introduces the future driving track and the traffic environment information into a diagnostic equation to determine whether the difference value between the future driving track and the traffic environment information and the index of the future driving track respectively meet tolerances.

The diagnostic equation will be interpreted mathematically. The diagnostic equation is expressed by $$L = \log\left\{\prod_{t=1}^{n}\left[\frac{2\prod_{t=1}^{2}I(|K_H(x_t)-K_i(x_t)|\geq\varepsilon_K)3^{I(D-V/2\leq 0)}}{5^{I(|D_L(x_t,y_t)-D_R(x_t,y_t)|\geq\varepsilon_D)}}\right]\right\}$$

wherein L is the deviation value; I($\ni$) is the indicator function; $K_H(x_t)$ is the future driving curvature at the present vehicle coordinate information $x_t$; $K_i(x_t)$ is the lane marker curvature information at the present vehicle coordinate information $x_t$; $(|K_H(x_t)-K_i(x_t)|)$ is the equation for calculating curvature difference; $\varepsilon_R$ is the tolerance of curvature; D is the distance to another vehicle information; V is the present vehicle speed information; (D-V/2) is the equation for calculating the neighboring vehicle distance index; $a_H$ is the present vehicle acceleration-deceleration information; $J_H$ is the present vehicle jerk information; $SR_H$ is the present vehicle steering wheel angular velocity information; $(a_H J_H/SR_H)$ is the equation for calculating lateral slide displacement index; $\varepsilon_A$ is the tolerance of lateral slide displacement; LTR (Load Transfer Ration) is the vehicle turnover index; $\varepsilon_L$ is the tolerance of turnover; $D_L(x_t,y_t)$ is the distance between the present vehicle coordinate information $x_t,y_t$ and the left lane marker position information; $D_R(x_t, y_t)$ is the distance between the present vehicle coordinate information $x_t,y_t$ and the right lane marker position information; $(|D_L(x_t,y_t)-D_R(x_t,y_t)|)$ is the equation for calculating the difference of the distance to the left lane marker and the distance to the right lane marker; $\varepsilon_D$ is the tolerance of difference of distances to left and right lane markers; $TTC_H$(Forward) is the forward collision time index; $\varepsilon_F$ is the tolerance of forward collision time; $TTC_R$(Host) is the rear collision time index; $\varepsilon_R$ is the tolerance of rear collision time; 2, 3, 5, 7, 11, and 13 are the numerals respectively representing different events; do LG(do lane change) is the event that the present vehicle changes lanes.

Figure 3:
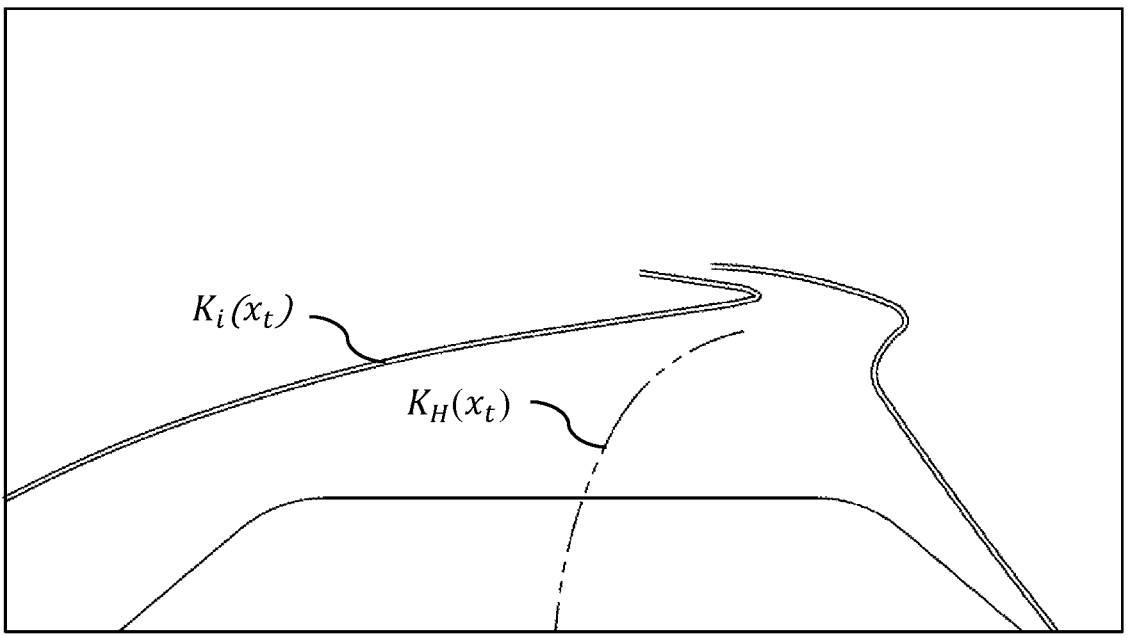
FIG. 3 is a diagram schematically showing calculation of difference of curvatures according to one embodiment of the present invention.
Figure 4:
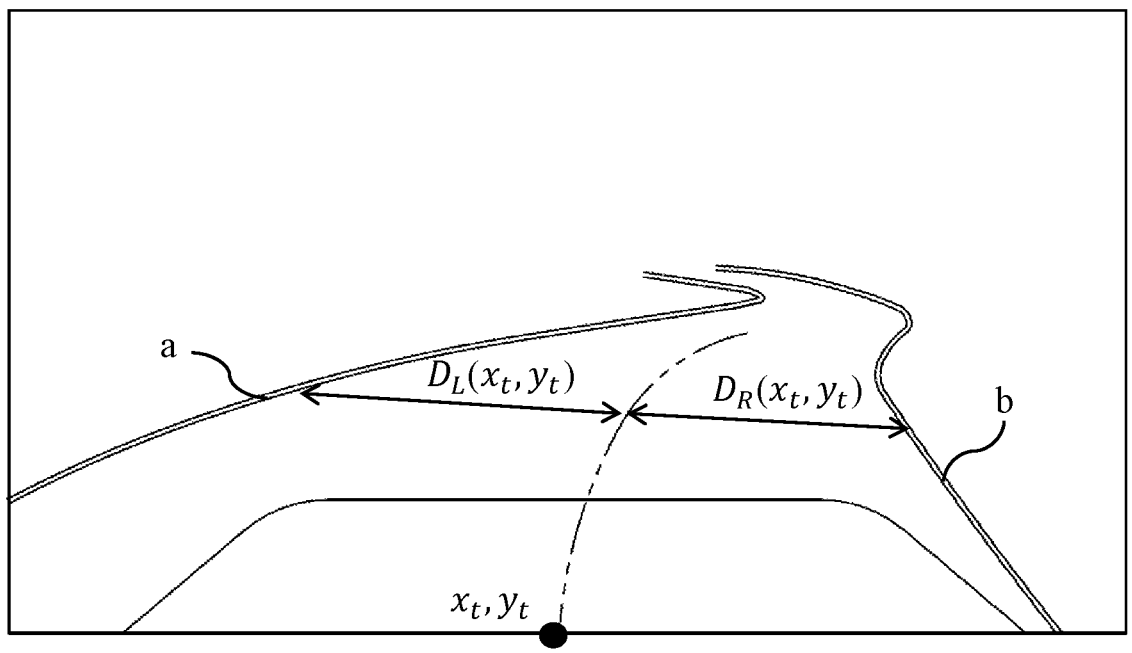
FIG. 4 is a diagram schematically showing calculation of difference of the distances to the left and right lane markers.

In other words, introduction of the future driving track and the traffic environment information into the diagnostic equation implements calculating the difference values between the future driving track and the traffic environment information, such as the difference of curvatures and the difference of the distances to the left and right lane markers. Refer to FIG. 3 for the calculation of the difference of curvatures. The future driving curvature $K_H(x_t)$ is compared with the lane marker curvature information $K_H(x_t)$ to obtain the absolute value of the difference of curvatures $(|K_H(x_t)-K_i(x_t)|)$, whereby to check whether the difference of curvatures is within the curvature tolerance $\varepsilon_K$. Refer to FIG. 4 for the calculation of the difference of the distances to the left and right lane markers. The distance between the present vehicle position information $x_t,y_t$ of the vehicle body information and the left lane marker position information a of the traffic environment information is expressed by $D_L(x_t,y_t)$. The distance between the present vehicle position information $x_t,y_t$ of the vehicle body information and the right lane marker position information b of the traffic environment information is expressed by $D_R(x_t,y_t)$. The absolute value of the difference of the two distances $(|D_L(x_t,y_t)-D_K(x_t,y_t)|)$ is worked out to determine whether it is within the tolerance of the difference of the distances to the left and right lane markers $\varepsilon_D$. The diagnostic equation also examines a plurality of indexes of the future driving track, e.g. checks whether the neighboring vehicle distance index (D-V/2) is within the tolerance of the distance to a neighboring vehicle; checks the lateral slide displacement index $(a_H J_H/SR_H)$ is within the tolerance of lateral slide displacement $\varepsilon_A$; checks whether the vehicle turnover index (LTR) is within the tolerance of turnover $\varepsilon_L$; checks whether the forward collision time index $TTC_H$ (Forward) is within the tolerance of forward collision time $\varepsilon_F$; checks whether the rear collision time index $TTC_R$(Host) is within the tolerance of rear collision time $\varepsilon_R$.

Refer to FIG. 2 again. As mentioned above, the central processor 14 introduces the future driving track and the traffic environment information into a diagnostic equation to determine whether each of the tolerances is satisfied. If each of the tolerances is satisfied, the process proceeds to Step S16. In Step S16, the deviation generated by the diagnostic equation has a value of zero. However, the value of zero is only for exemplification. The present invention does not limit that deviation must has a value of zero. In such a case, the central processor 14 transmits the future driving track to the automatic driving controller 16, and the automatic driving controller 16 automatically drive the present vehicle according to the future driving track.

If it is determined that not all the tolerances are satisfied in Step S14, the process proceeds to Step S18, and the diagnostic equation generates a deviation having a non-zero value. The non-zero value is only for exemplification. The present invention does not limit that the value of the deviation must be in form of Arabic numerals. In such a case, the central processor 14 transmits notification information to the automatic driving controller 16 to instruct the automatic driving controller 16 to interrupt automatic driving. Alternatively, after generating the notification information, the central processor 14 modifies the future driving track to make the difference of curvatures, the neighboring vehicle distance index, the lateral slide displacement index, the vehicle turnover index, the difference of the distances to the left and right lane markers, the forward collision time index, and the rear collision time index respectively meet the curvature tolerance, the tolerance of the distance to a neighboring vehicle, the tolerance of lateral slide displacement, the tolerance of turnover, the tolerance of the difference of the distances to the left and right lane markers, the tolerance of forward collision time, and the tolerance of rear collision time. Thereby, a new future driving track is generated by the central processor 14 and transmitted to the automatic driving controller 16. Thus, the automatic driving controller 16 undertakes automatic driving according to the new future driving track.

The notification information includes the deviation value L worked out by the diagnostic equation. The number of the deviation value L is meaningful. In detail, the numerals 2, 3, 5, 7, 11, and 13 respectively represent different events and dominate the calculation of the deviation value L. Thereby, the user can fast recognize which one of the indexes or difference values does not meet the tolerance.

For example, while the worked out deviation value L=0, it means that all the indexes and difference values meet the tolerances. While the worked out deviation value L=n log 2, it means that the difference of the curvatures, which is worked from $(+K_H(x_t)-K_i(x_t)|)$, does not meet the tolerance of curvatures. While the worked out deviation value L=n log 3, it means that the neighboring vehicle distance index, which is worked out from (D−V/2), does not meet the tolerance of the distance to a neighboring vehicle. The cases of the other numerals 5, 7, 11, and 13 are similar to the cases mentioned above and will not repeat herein. Naturally, it is possible that two or more indexes or difference values do not meet the tolerances. For example, while L=n log 6, it may indicate the events, which are respectively associated with $(|K_H(x_t)-K_i(x_t)|)$ and (D−V/2) and separately represented by 2 and 3 because 6 is the product of 2 and 3. Therefore, the representative numerals must be prime numbers so that the represented events can be recognized without confusion.

In conclusion, the present invention can automatically examine an automatic driving-assistant system to judge whether the future driving track, the curvature of the present road, the distances to the lane markers, the distance to a barrier, etc. are within the tolerances thereof and thus determine whether the automatic driving track is safe. The present invention can also use the diagnostic equation to directly determine the parameters needing calibration in the future driving track, whereby the central processor can modify the parameters to improve the safety of automatic driving.

The embodiments described above are only to exemplify the present invention but not to limit the scope of the present invention. Any equivalent modification or variation according to the spirit and characteristics of the present invention is to be also included by the scope of the present invention.

What is claimed is:

1. An automatic driving method able to diagnose decisions, comprising steps:
   receiving vehicle body information of a present vehicle associated with operational characteristics of said vehicle and traffic environment information associated with external environment parameters and parameters associated with interaction with an external object;
   generating a future driving track of said present vehicle according to said vehicle body information; and
   introducing said future driving track and said traffic environment information into a diagnostic equation to determine whether difference values of said future driving track, difference values of said traffic environment information, and associated indexes of said future driving track and said traffic environment information meet respective tolerances,
   if said tolerances are not met, transmitting notification information to an automatic driving controller;
   if said tolerances are met, transmitting said future driving track to said automatic driving controller to enable said automatic driving controller to undertake automatic driving according to said future driving track;
   wherein said diagnostic equation is a logarithm of a function of indicator functions to examine whether a curvature difference between a future driving curvature of said future driving track and lane marker curvature information of said traffic environment information, a neighboring vehicle distance index of said future driving track, a lateral slide displacement index of said future driving track, a vehicle turnover index of said future driving track, a difference of distances to left and right lane markers, a forward collision time index of said future driving track, and a rear collision time index of said future driving track respectively meet a tolerance of curvature, a tolerance of distance to a neighboring vehicle; a tolerance of lateral slide displacement, a tolerance of turnover, a tolerance of difference of distances to left and right lane makers, a tolerance of forward collision time, and a tolerance of rear collision time;
   wherein the said diagnostic equation using different prime numbers greater than 1 as representative numerals to recognize represented events, each represented event associated with a corresponding indicator function, whereby each indicator function includes a tolerance value for determination of the contribution of the prime number associated with each event in the diagnostic equation.

2. The automatic driving method able to diagnose decisions according to claim 1, wherein said diagnostic equation generates a non-zero deviation value before said step of transmitting said notification information to said automatic driving controller, and generates a zero deviation value before said step of transmitting said future driving track to said automatic driving controller.

3. The automatic driving method able to diagnose decisions according to claim 1, wherein said vehicle body information includes present vehicle steering wheel angular velocity information; present vehicle speed information; present vehicle acceleration-deceleration information, and present vehicle coordinate information; said traffic environment information is image information; lane marker curvature information, distance to another vehicle information, left lane marker position information, right lane marker position information, and another vehicle speed information is worked out according to said image information.

4. The automatic driving method able to diagnose decisions according to claim 3, wherein said difference of distances to left and right lane markers is a difference between a distance between said present vehicle position information of said vehicle body information and said left lane marker position information of said traffic environment information and a distance between said present vehicle position information of said vehicle body information and said right lane marker position information of said traffic environment information.

5. The automatic driving method able to diagnose decisions according to claim 3, wherein said diagnostic equation is expressed by $$L = \log\left\{\prod_{t=1}^{n}\left[\begin{array}{c}2\prod_{i=1}^{2}I(|K_H(x_t)-K_i(x_t)|\geq\varepsilon_K)3^{I(D-V/2\leq 0)}\\7^{I(a_H J_H/SR_H\geq\varepsilon_A)}13^{I(LTR\geq\varepsilon_L)}\\5^{I(|D_L(x_t,y_t)-D_R(x_t,y_t)|\geq\varepsilon_D)}\\11^{I(doLG)[I(TTC_H(Forward)\leq\varepsilon_F)\cdot I(TTC_R(Host)\leq\varepsilon_R)]}\end{array}\right]\right\}$$

wherein L is a deviation value; $I(\ni)$ is said indicator function; $K_H(x_t)$ is said future driving curvature at said present vehicle coordinate information $x_t$; $K_i(x_t)$ is said lane marker curvature information at said present vehicle coordinate information $x_t$; $\varepsilon_K$ is said tolerance of curvature; D is said distance to another vehicle information; V is said present vehicle speed information; $a_H$ is said present vehicle acceleration-deceleration information; $J_H$ is present vehicle jerk information; $SR_H$ is said present vehicle steering wheel angular velocity information; $(a_H J_H / SR_H)$ is the equation for calculating lateral slide displacement index; $\varepsilon_A$ is said tolerance of lateral slide displacement; LTR is said vehicle turnover index; $\varepsilon_L$ is said tolerance of turnover; $D_L(x_t, y_t)$ is said distance between said present vehicle coordinate information $x_t, y_t$ and said left lane marker position information; $D_R(x_t, y_t)$ is said distance between said present vehicle coordinate information $x_t, y_t$ and said right lane marker position information; $\varepsilon_D$ is said tolerance of difference of distances to left and right lane markers; $TTC_H(Forward)$ is said forward collision time index; $\varepsilon_F$ is said tolerance of forward collision time; $TTC_R(Host)$ is said rear collision time index; $\varepsilon_R$ is said tolerance of rear collision time; 2, 3, 5, 7, 11, and 13 are said representative numerals respectively representing different events; do LG(do lane change) is an event that said present vehicle changes lanes.

6. The automatic driving method able to diagnose decisions according to claim 1, wherein after said step of transmitting said notification information to said automatic driving controller, said automatic driving controller interrupts automatic driving according to said notification information.

7. The automatic driving method able to diagnose decisions according to claim 1, wherein after said step of transmitting said notification information to said automatic driving controller, said future driving track is modified to generate a new future driving track and make said curvature difference, said neighboring vehicle distance index, said lateral slide displacement index, said vehicle turnover index, said difference of distances to left and right lane markers, said forward collision time index, and said rear collision time index respectively meet said tolerance of curvature, said tolerance of distance to a neighboring vehicle; said tolerance of lateral slide displacement, said tolerance of turnover, said tolerance of difference of distances to left and right lane makers, said tolerance of forward collision time, and said tolerance of rear collision time, and wherein said new future driving track is transmitted to said automatic driving controller to enable said automatic driving controller to undertake automatic driving according to said new future driving track.

8. An automatic driving device able to diagnose decisions, comprising:
at least one vehicle body signal sensor detecting a present vehicle to generate vehicle body information associated with operational characteristics of said vehicle;
at least one environment sensor detecting external environment to generate traffic environment information associated with external environment parameters and parameters associated with interaction with an external object;
a central processor electrically connected with said vehicle body signal sensor and said environment sensor, generating a future driving track according to said vehicle body information, and introducing said future driving track and said traffic environment information into a diagnostic equation, wherein if difference values between said future driving track, difference values between said traffic environment information, and associated indexes of said future driving track and said traffic environment information do not meet tolerances, said central processor sends out notification information, and wherein if said difference values between said future driving track, and said difference values between said traffic environment information, and said associated indexes of said future driving track and said traffic environment information meet said tolerances, said central processor directly sends out said future driving track; and
an automatic driving controller electrically connected with said central processor and receiving said notification information or said future driving track, wherein if said automatic driving controller receives said future driving track, said automatic driving track undertakes automatic driving according to said future driving track;
wherein said diagnostic equation is a logarithm of a function of indicator functions to examine whether a curvature difference between a future driving curvature of said future driving track and lane marker curvature information of said traffic environment information, a neighboring vehicle distance index of said future driving track, a lateral slide displacement index of said future driving track, a vehicle turnover index of said future driving track, a difference of distances to left and right lane markers, a forward collision time index of said future driving track, and a rear collision time index of said future driving track respectively meet a tolerance of curvature, a tolerance of distance to a neighboring vehicle; a tolerance of lateral slide displacement, a tolerance of turnover, a tolerance of difference of distances to left and right lane makers, a tolerance of forward collision time, and a tolerance of rear collision time;
wherein the said diagnostic equation using different prime numbers greater than 1 as representative numerals to recognize represented events, each represented event associated with a corresponding indicator function, whereby each indicator function includes a tolerance value for determination of the contribution of the prime number associated with each event in the diagnostic equation.

9. The automatic driving device able to diagnose decisions according to claim 8, wherein said diagnostic equation generates a non-zero deviation value before transmitting said notification information to said automatic driving controller, and generates a zero deviation value before transmitting said future driving track to said automatic driving controller.

10. The automatic driving device able to diagnose decisions according to claim 8, wherein said at least one vehicle body signal sensor includes a steering wheel angular velocity sensor, a vehicle speed sensor, and a position sensor, which respectively detect present vehicle steering wheel angular velocity information, present vehicle speed information, present vehicle acceleration-deceleration information, and present vehicle coordinate information.

11. The automatic driving device able to diagnose decisions according to claim 10, wherein said environment sensor is an image sensor generating image information; said lane marker curvature information, said distance to another vehicle information, said left lane marker position information, said right lane marker position information, and said another vehicle speed information is worked out according to said image information.

12. The automatic driving device able to diagnose decisions according to claim 11, wherein said difference of distances to left and right lane markers is a difference between a distance between said present vehicle position information of said vehicle body information and said left lane marker position information of said traffic environment information and a distance between said present vehicle position information of said vehicle body information and said right lane marker position information of said traffic environment information.

13. The automatic driving device able to diagnose decisions according to claim 11, wherein said diagnostic equation is expressed by $$L = \log\left\{\prod_{t=1}^{n}\left[\frac{2^{\prod_{i=1}^{2} I(|K_H(x_t)-K_i(x_t)|\geq \varepsilon_K)} 3^{I(D-V/2\leq 0)}}{5^{I(|D_L(x_t,y_t)-D_R(x_t,y_t)|\geq \varepsilon_D)}} \right.\right.$$
$$\left.\left. \cdot \frac{7^{I(a_H J_H/SR_H \geq \varepsilon_A)} 13^{I(LTR\geq \varepsilon_L)}}{11^{I(doLG)[I(TTC_H(Forward)\leq \varepsilon_F)+I(TTC_R(Host)\leq \varepsilon_R)]}}\right]\right\}$$

wherein L is said deviation value; I( ∋ ) is said indicator function; $K_H(x_t)$ is said future driving curvature at said present vehicle coordinate information $x_t$; $K_i(x_t)$ is said lane marker curvature information at said present vehicle coordinate information $x_t$; $\varepsilon_K$ is a tolerance of curvature; D is said distance to another vehicle; V is said present vehicle speed information; $a_H$ is said present vehicle acceleration-deceleration information; $J_H$ is present vehicle jerk information; $SR_H$ is said present vehicle steering wheel angular velocity information; $(a_H J_H/SR_H)$ is the equation for calculating lateral slide displacement index; $\varepsilon_A$ is said tolerance of lateral slide displacement; LTR is said vehicle turnover index; $\varepsilon_L$ is said tolerance of turnover; $D_L(x_t,y_t)$ is said distance between said present vehicle coordinate information $x_t,y_t$ and said left lane marker position information; $D_R(x_t,y_t)$ is said distance between said present vehicle coordinate information $x_t,y_t$ and said right lane marker position information; $\varepsilon_D$ is said tolerance of difference of distances to left and right lane markers; $TTC_H$(Forward) is said forward collision time index; $\varepsilon_F$ is said tolerance of forward collision time; $TTC_R$(Host) is said rear collision time index; $\varepsilon_R$ is said tolerance of rear collision time; 2, 3, 5, 7, 11, and 13 are said representative numerals respectively representing different events; do LG(do lane change) is an event that said present vehicle changes lanes.

14. The automatic driving device able to diagnose decisions according to claim 8, wherein after said central processor transmits said notification information to said automatic driving controller, said automatic driving controller interrupts automatic driving.

15. The automatic driving device able to diagnose decisions according to claim 8, wherein said central processor modifies said future driving track to generate a new future driving track and make said curvature difference, said neighboring vehicle distance index, said lateral slide displacement index, said vehicle turnover index, said difference of distances to left and right lane markers, said forward collision time index, and said rear collision time index respectively meet said tolerance of curvature, said tolerance of distance to a neighboring vehicle; said tolerance of lateral slide displacement, said tolerance of turnover, said tolerance of difference of distances to left and right lane makers, said tolerance of forward collision time, and said tolerance of rear collision time, and wherein said central processor transmits said new future driving track to said automatic driving controller to enable said automatic driving controller to undertake automatic driving according to said new future driving track.

* * * * *